United States Patent [19]

Moitzfeld

[11] 4,368,014
[45] Jan. 11, 1983

[54] APPARATUS FOR PRODUCING VULCANIZED BELTS WITH STEEL REINFORCEMENT

[75] Inventor: Winfried Moitzfeld, Krefeld, Fed. Rep. of Germany

[73] Assignee: G. Siempelkamp GmbH & Co., Krefeld, Fed. Rep. of Germany

[21] Appl. No.: 307,947

[22] Filed: Oct. 2, 1981

[30] Foreign Application Priority Data

Oct. 4, 1980 [DE] Fed. Rep. of Germany ....... 3037611

[51] Int. Cl.$^3$ ..................... B29C 17/02; B29D 29/02; B29H 7/22
[52] U.S. Cl. ................................ 425/28 B; 425/123; 425/111
[58] Field of Search .................. 425/28 B, 34 B, 111, 425/117, 120, 221, 122, 123, 338

[56] References Cited

U.S. PATENT DOCUMENTS

| 3,222,749 | 12/1965 | Haas | 425/122 X |
| 3,616,496 | 11/1971 | Anglioletti et al. | 425/122 X |
| 3,868,204 | 2/1975 | Bongers | 425/338 |
| 3,999,914 | 12/1976 | Breker et al. | 425/122 X |
| 4,036,572 | 7/1977 | Yeager | 425/338 |
| 4,094,619 | 6/1978 | George | 425/338 X |
| 4,309,375 | 1/1982 | Rabenecker | 425/34 B X |

FOREIGN PATENT DOCUMENTS 1579088 8/1970 Fed. Rep. of Germany .

OTHER PUBLICATIONS

Article "Siempelkamp-Anleagey Zur Herstellung von Fordergurten mit Stahlseileinlagen bis 3200 mm Breiet" pp. 5-7.

Primary Examiner—J. Howard Flint, Jr.
Attorney, Agent, or Firm—Karl F. Ross

[57] ABSTRACT

A belt-fabrication apparatus for producing belts from layers of vulcanizable material and steel-wire reinforcement includes a coil frame from which the reinforcement wire may be withdrawn, passed through a wire clamp, covered with vulcanizable layers, subjected to pressing in a vulcanizing press, and engaged by a traction and/or clamp device downstream of the press as part of the belt, the latter being taken up on a coil. According to the invention, slack is prevented from forming (or is taken up) in the wire by providing each of the supply coils with a drive sprocket and a slip clutch between this sprocket and the reel, a plurality of such sprockets being engaged by a common chain driven by a motor tending to rotate the reels in senses opposite to the direction of rotation of the reels for paying out the wire.

4 Claims, 4 Drawing Figures

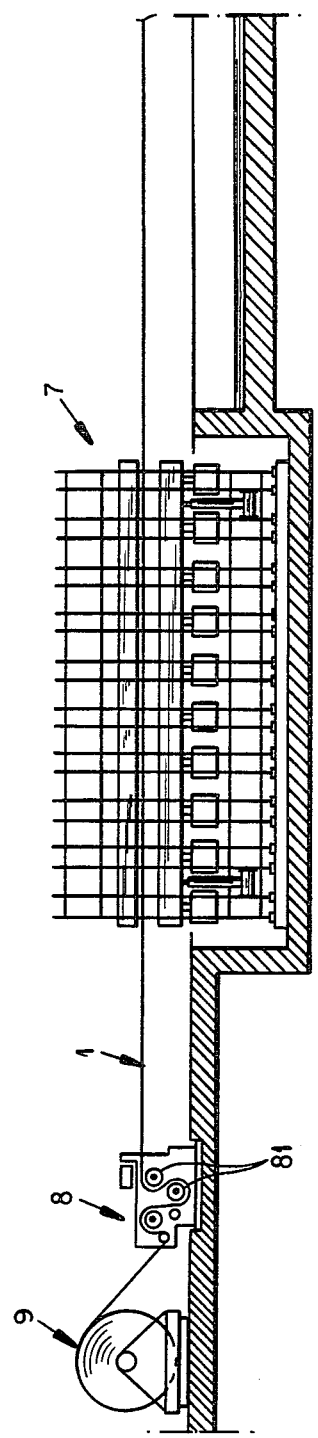
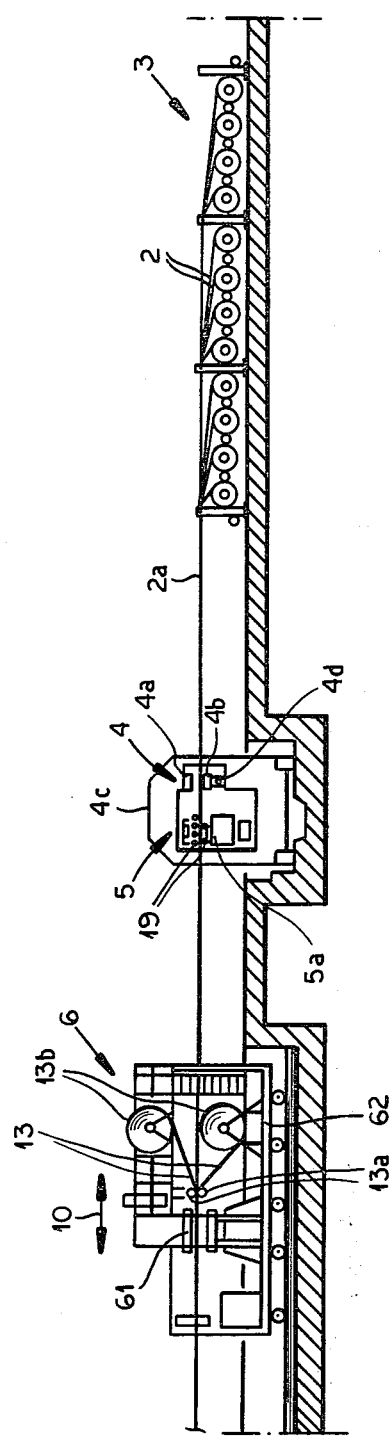
FIG.1B
FIG.1A

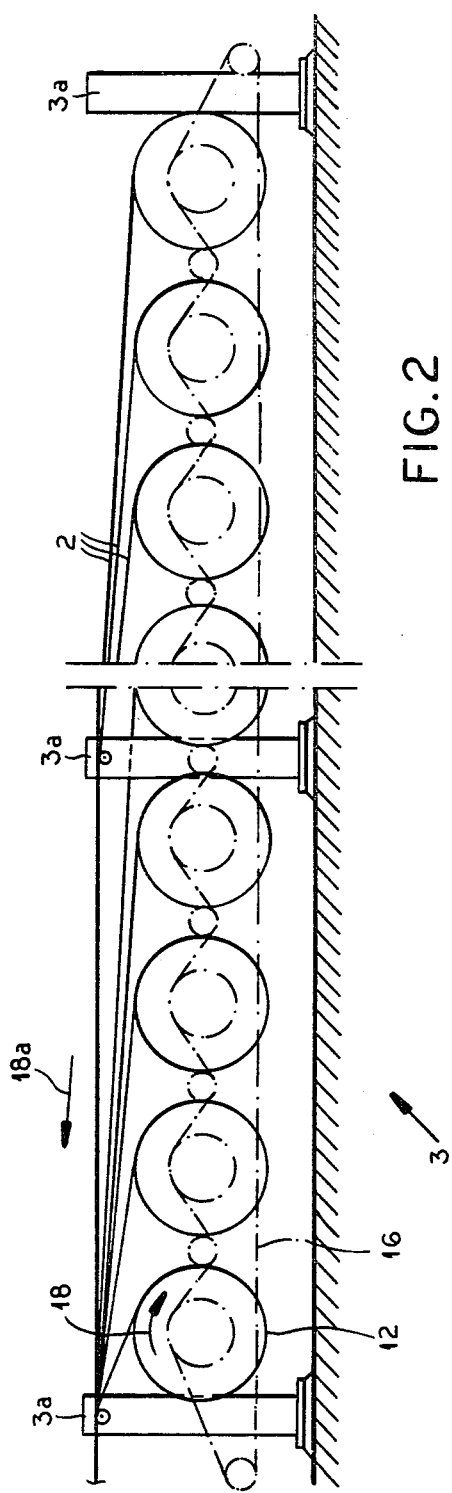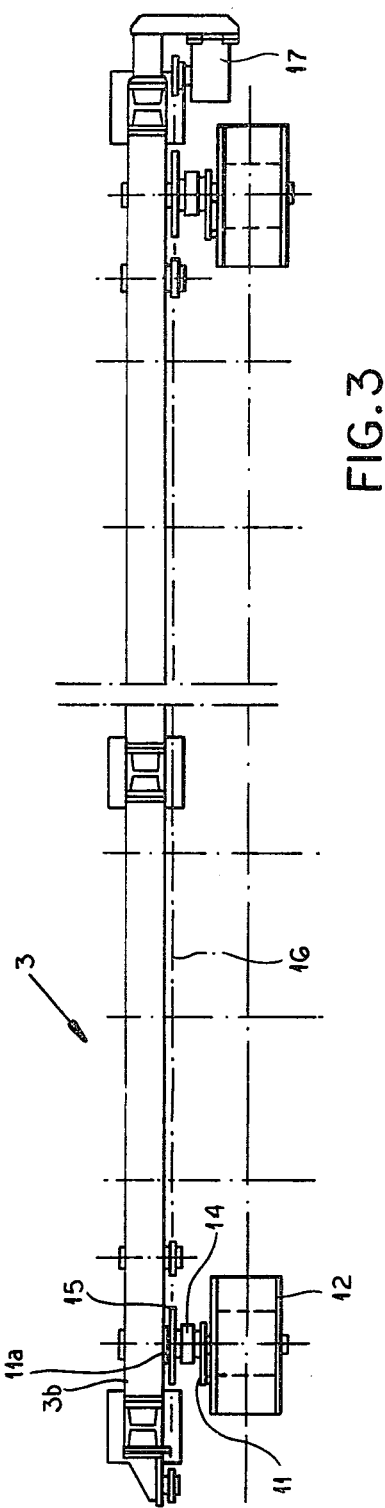

APPARATUS FOR PRODUCING VULCANIZED BELTS WITH STEEL REINFORCEMENT

FIELD OF THE INVENTION

My present invention relates to the production of vulcanized belts with a reinforcement consisting of individual steel wires embedded in and bonded to the vulcanized material. More particularly, the invention relates to an apparatus for fabricating such belts.

BACKGROUND OF THE INVENTION

Steel-wire reinforced belts of vulcanized material, e.g. rubber compositions, are fabricated for a variety of purposes. They may, for example, be used as flat drive belts for machinery or for like force-transmission purposes but more generally are employed as conveyor belts for transporting of goods, people or materials over long or short distances within fabrication, chemical, metallurgical or other industrial plants or to and from such plants or elsewhere.

Regardless of the application, it is important that the belts be of high quality, i.e. the bond between the vulcanizable elastomeric material and the steel reinforcing wires have a long life under a wide variety of stress conditions.

Failure of the belts prematurely may result at least in part from relative movement of the reinforcing wires and the surrounding vulcanized material. It has also been found that isotropism is important in such belts, i.e. that the belts have properties which are as uniform as possible over the belt length. Investigations have shown that such isotropism or uniformity of properties over the length of the belt requires uniform wire tension which is reproducibly generated in successive lengths of the belt as it is produced.

In general the apparatus utilized to produce such a belt operates incrementally in units of lengths determined by the length of the vulcanization press.

An apparatus for fabricating such belts thus may have a supply of reinforcing wire, generally in the form of a frame provided with a multiplicity of reels from which the steel wire is paid out and guided through the press.

The wires, generally disposed parallel to one another in at least one plane, thus form a reinforcing layer which can be covered from above and below at a layer-application station with one or more layers of vulcanizable material, the resulting composite thereupon passing into the press in which this material is compacted around the wires and is vulcanized to form a unitary structure to which the wires are bonded and in which they are embedded.

The belt emerging from the opposite end of the press can be wound up on a take-up coil.

Since the composite structure may be stationary during the pressing operation if the press is not movable, it is advantageous to make the layer-application means movable. Thus, when a given unit of length of the belt previously produced in the press is moved outwardly therefrom, the layer-applying device on a movable carriage, may accompany the strands as they shift in the direction of the press so that while the press is closed on the next implement of length and the strands and belt are stationary, the layer-applying device can be shifted in the opposite direction to form another length of the composite adapted to be drawn in the press in the next cycle.

In a specific apparatus for this purpose described in *Pressen und Anlagen fur die Gummi-Industrie* (Presses and Installations for the Rubber Industry), a brochure published by G. Siempelkamp GmbH & Co., Krefeld, Germany, pages 5 through 7, downstream of the reel frame and a coil storage and upstream of the layer-applying carriage, there is provided a wire clamp which can seize the wires of the reinforcing array, once these wires have been advanced to allow the desired degree of longitudinal prestress to be applied to these wires. The wire clamp thus may have a dual function of seizing the wires to prevent extraction of additional lengths of wire from the reel and of generating in the wire stretch between the clamp and the take-off cord, the desired length degree of longitudinal prestress.

This clamp and stressing device is followed by the layer-applying station which can be movable in the manner described while both the clamping and wire supply devices are flexibly located with respect to the press which can be fixed along the path of the belt as well. The vulcanizing press follows the layer-applying carriage and downstream of the press there is provided a traction clamping device capable of driving the belt through the press and hence the wire reinforcing strands from the respective reel and through the press through the clamping and stressing device and along the path previously described. This tractive clamping means may include separate means for entrainment of the belt and for clamping the latter or a single means performing both directions. The clamping effect is necessary to prevent reverse movement of the belt under traction stresses applied by the wire tensioning means.

Downstream of the tractive clamping means is the take-up coil.

Experience with such apparatus has shown that advance of the previously formed length of belt from the press and extraction of corresponding lengths of wire from the wire supply requires a wire storage as described in the latter publication to ensure that the wire clamp can remain closed during the advance previously mentioned. Unavoidably because of tolerance differences or the like one or more of the wires along the path tends to hang down in a loop from the plane of the array of wires and to introduce nonuniformities in tensioning during the fabrication of the belt.

This slack, if permitted to remain, results in belts of poor quality and, if taken up by hand, results in time-consuming operations which increase the cost of the belt without always guaranteeing that successive length thereof will be of uniformly high quality.

In German patent document DE-OS No. 15 79 088, for example, this wire storage means is eliminated and the wire clamp is located directly ahead of the wire supply device. This does not eliminate the problem, however, since both clamps on opposite sides of the press generally operate by engaging all of the wires simultaneously and uniformly so that any tolerance differences between individual wires may result in a slack.

OBJECTS OF THE INVENTION

It is the principal object of the present invention to provide an apparatus of the class described for the production of steel-reinforced belts of vulcanized material which, however, is free from the disadvantages of these earlier systems.

Another object of the invention is to provide an apparatus for the fabrication of steel-reinforced belts of elastomeric material whereby take-up of the slack of individual reinforcing wires can be readily effected.

SUMMARY OF THE INVENTION

These objects and others which will become apparent hereinafter are attained, in accordance with the present invention, in an apparatus for making belts and especially conveyor belts which comprises along a belt-fabrication path and in the direction of movement of the belt, a wire supply frame having individual reels rotatable hereof for delivering individual wires to this path, a wire clamp engageable with the array of wires downstream of the supply frame, a wire-tensioning device downstream of the wire clamp and engageable with the array of wires for tensioning same between this clamp and a take-up reel at the downstream end of the path, a layer-applying station downstream of the wire-tensioning device for applying at least one layer of vulcanizable material to the array of reinforcing wires, a vulcanizing press downstream of the station for pressing the composite of this material and the wires to compact the material around the wires, vulcanizing the material and bonding material to the reinforcing wires, and a tension clamping means downstream of the press for entraining the belt formed by the press and the wires in the fabrication direction.

According to the invention the wire clamp is located directly ahead of the supply frame, i.e. no wire storage is provided upstream of the wire clamp and the individual reels of the wire supply frame are each driven via a slip clutch in a sense opposite of the sense of rotation of the reel when wire is withdrawn therefrom by the traction means.

I have found that the tolerance-related slack normally associated with individual steel reinforcement wires between the traction clamping means and the supply means can be conveniently and simply eliminated by applying a torque to each of the reels in the direction opposite the rotation direction for supply of the wire through a clip clutch while at the same time disposing the wire clamp directly ahead of the supply frame. When the device is operated so that the clutches of all of the reels are slipping, all of the wires can be considered to be tensioned or stretched to the same degree provided, of course, that the maximum turn at which slippage occurs is the same for all clutches.

Surprisingly, the coupling of a driven reel slip clutch to the reel holders or reel of the wire supply frame has been found to be advantageous not only for the take-off of slack but also for a change in the type of wire which is used. In the latter case, the previous wire must be cut immediately ahead of the vulcanizing press and drawn back through the layer-applying station and wire clamp to the supplier reels in a convenient and economical manner by the same drive which takes up this slack.

In an earlier system retraction of lengths of wire for change-over had to be done by hand and frequently continued the down time of the apparatus for several hours.

The elimination of a wire storage device as has been commonly provided in the past not only represents a cost saving but allows the traction clamp to draw the wire from the reels against the intervening torque applied by the drive of the invention. As a result, there is no danger of slack development anywhere in the system.

The length of the belt fabrication line can be reduced by 7 meters by elimination of the wire storage.

According to the invention, the drive wheels of a plurality of reels are engaged by a common endless drive element, e.g. a chain, displaced by a motor. The reel can thus be driven in a group or all of the reels by a single drive chain and a single motor.

BRIEF DESCRIPTION OF THE DRAWING

The above and other objects, features and advantages of the present invention will become more readily apparent from the following description, reference being made to the accompanying drawing in which:

FIG. 1A is a diagrammatic side elevational view of the upstream half of a line for fabricating conveyor belts according to the invention;

FIG. 1B is a similar view of the downstream half of this line;

FIG. 2 is an enlarged side elevational view of the reel frame according to the invention; and FIG. 3 is a diagrammatic plan view of one side of the reel frame.

SPECIFIC DESCRIPTION

The apparatus shown in FIGS. 1A and 1B is designed to produce steel-wire reinforced rubber conveyor belt 1, the reinforcing wires being shown at 2 and forming a planar array when applied in the elastomeric material.

From right to left in FIGS. 1A and 1B the apparatus comprises a reel frame 3 from which the individual wires 2 paid out from respective reels 12 to form the array, a wire clamp 4, a wire stressing device 5, a layer-applying station 6, a heated-platen vulcanizing press 7, a traction clamping device 8 and a take-up coil station 9.

The reel frame 3, the clamp 4, the tensioning device 5, the vulcanization press 7, the traction clamp 8 and the coiling means 9 are fixedly located along the path while the layer-applying station is shifted on a carriage 62 in the direction of the arrow 10, i.e. toward and away from the press.

As can be seen from FIGS. 2 and 3, the reel frame 3 comprises a plurality of passes 3a which are interconnected by beams 3b on which respective reel mounts 11 are journaled via respective shafts 11a. Each of these shafts is keyed at a sprocket wheel 15 and drives the input side of a slip clutch 14, the output side of which is connected to the reel mount 11 to which the reel 12 is removably affixed.

The wire clamp 4 has a pair of clamping bars 4a and 4b extending across the array 2a of reinforcing wires, the upper bar 4a being fixed to the frame 4c while the lower bar is removable by a fluid-operated cylinder 4d so that all of the wires are simultaneously gripped when the clamp 4 is engaged.

Upstream of the clamp 4, the tensioning device 5 may comprise arrays of rolls 19 above and below the wire array 2a with the lower rolls being disposed between the upper rolls. The lower rolls can be vertically displaced by a fluid operated cylinder 5a to press the wires, clamped at 4, into loops between wires of upper rolls, thereby applying tension to the wires between the tensioning device 5 and the traction clamp 8.

The layer-applying station 6 comprises a carriage 62 which is formed with a prepress 61 adapted to compact the layers 13 against the array 2a of wires, the layer 13 of elastomeric vulcanizable material, i.e. natural or synthetic rubber being applied by rollers 13a from supply coils 13b on the carriage.

The vulcanizing press 7 is, as noted, a heated-platen press while the traction clamp 8 can comprise a plurality of rolls 81, which are driven, and over which the belt is slung through large contact angles so that these rolls form a friction clamp preventing retraction of the belt in the opposite direction.

For FIG. 1A it is apparent that the wire clamp 4 directly follows the reel frame 3, i.e. that no wire storage means is provided between the two.

The sprocket reels 15 are engaged by a single endless chain 16 which is driven by a motor 17 in a direction tending to rotate the reels 12 in the clockwise sense represented by the arrow 18, i.e. opposite to the direction of advance of the wire (arrow 18a) for the formation of the next increment of length of the belt.

After a length of belt has been vulcanized the press 7 is opened and the tension device 5 and clamp 4 can also be spread to allow the traction clamp 8 to form the fabricated length of belt from the press and replace it by a length of composite formed by the station 6.

Hence the next section to be vulcanized is drawn into the press and the carriage 62 is drawn to the left and corresponding lengths of wire are drawn from the reels 12. To take up the slack, motor 17 is then started and is operated until all of the clutches 14 slip, whereupon clamp 4 is closed and the tensioning device 5 is actuated. The press is closed and carriage 62 is shifted to the right to deposit layers 13 upon the wire array 2a with press 6 prepressing the rubber around the wires. If other reinforcements are required, the wires 2 are cut at the press and the motor 17 is operated to draw the free length of wire back onto the reels 12.

I claim:

1. In an apparatus for the fabrication of steel-wire reinforced belts of vulcanizable material along a belt-fabrication path, said apparatus comprising in succession along said path, a reel frame form with a plurality of individual wire reels for delivering respective reinforcing wires to said path, a wire clamp engageable with said wires to retain the same, a wire tensioning device engageable with said wires to traction same, a layer-applying station for applying at least one layer of vulcanizable material to said wires, a vulcanizing press receiving a composite formed by said material and said wires to press the same into a belt, traction clamping means for drawing said belt from said press and displacing said wires along said path from said reel frame, and a take-up coil for receiving said belt from said traction clamp, the improvement wherein said wire clamp is disposed directly ahead of said frame on each of said reels is provided with a slip clutch and means for driving an input side of said slip clutch in a sense opposite the sense of rotation of said reel by said traction clamp, thereby eliminating slack in said wires.

2. The improvement defined in claim 1 wherein said means for driving includes a common element interconnecting a plurality of said reels for simultaneously driving same.

3. The improvement defined in claim 1 wherein said means for driving includes a single motor operatively connecting with all of said inputs.

4. The improvement defined in claim 1, claim 2 or claim 3 wherein each of said reels is mounted upon a reel carrier connected with an output side of the respective slip clutch, the input side of each clip clutch being provided with a sprocket reel, a common chain passing over each of said sprocket reels and entraining same.

* * * * *